(12) United States Patent
Ferris

(10) Patent No.: US 8,606,878 B2
(45) Date of Patent: Dec. 10, 2013

(54) SYSTEMS AND METHODS FOR DE-POPULATING CLOUD DATA STORE

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 204 days.

(21) Appl. No.: 13/036,977

(22) Filed: Feb. 28, 2011

(65) Prior Publication Data
US 2012/0221683 A1 Aug. 30, 2012

(51) Int. Cl.
*G06F 15/16* (2006.01)

(52) U.S. Cl.
USPC ........... 709/217; 709/218; 709/219; 709/225; 709/242; 709/249; 711/100; 711/114

(58) Field of Classification Search
USPC ................ 709/217–219, 223, 225, 242, 249; 711/100, 114
See application file for complete search history.

(56) References Cited

U.S. PATENT DOCUMENTS

| | | | |
|---|---|---|---|
| 5,892,915 A * | 4/1999 | Duso et al. | 709/219 |
| 6,625,750 B1 * | 9/2003 | Duso et al. | 714/11 |
| 7,013,322 B2 * | 3/2006 | Lahr | 709/201 |
| 8,185,663 B2 * | 5/2012 | Cochran et al. | 709/250 |
| 2003/0225861 A1 * | 12/2003 | Iwamura et al. | 709/219 |
| 2007/0183439 A1 * | 8/2007 | Osann | 370/406 |
| 2008/0294698 A1 * | 11/2008 | Fujimoto et al. | 707/200 |
| 2010/0161870 A1 * | 6/2010 | Daniel | 710/314 |
| 2010/0318630 A1 * | 12/2010 | Howell et al. | 709/218 |
| 2010/0322255 A1 * | 12/2010 | Hao et al. | 370/398 |
| 2010/0332818 A1 * | 12/2010 | Prahlad et al. | 713/150 |
| 2011/0055377 A1 * | 3/2011 | Dehaan | 709/224 |
| 2011/0082935 A1 * | 4/2011 | Zetterman et al. | 709/226 |
| 2011/0179142 A1 * | 7/2011 | Ravichandran et al. | 709/218 |
| 2011/0314069 A1 * | 12/2011 | Alatorre et al. | 707/827 |
| 2012/0054325 A1 * | 3/2012 | Backa | 709/223 |
| 2012/0054731 A1 * | 3/2012 | Aravamudan et al. | 717/170 |
| 2012/0072985 A1 * | 3/2012 | Davne et al. | 726/22 |
| 2012/0089781 A1 * | 4/2012 | Ranade et al. | 711/118 |
| 2012/0110570 A1 * | 5/2012 | Jacobson et al. | 718/1 |
| 2012/0151074 A1 * | 6/2012 | Wood et al. | 709/228 |
| 2012/0185926 A1 * | 7/2012 | Topatan et al. | 726/7 |
| 2012/0258777 A1 * | 10/2012 | Huang | 455/557 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.

(Continued)

*Primary Examiner* — Alina N Boutah
(74) *Attorney, Agent, or Firm* — Lowenstein Sandler LLP

(57) ABSTRACT

Embodiments relate to systems and methods for de-populating a cloud data store. In aspects, data from premise or other sources can be stored in a set of host storage clouds. A network administrator, owner, or other user can initiate the extraction of the set of cloud-populated data, and migrate that data to a set of step-down data stores, such as on-premise databases, servers, and/or other stores. A staging engine hosted in a cloud data distribution service can manage the discovery, reading-out, and delivery of the set of cloud-populated data to the set of step-down data stores. The staging engine can configure high-bandwidth data connections to the distribution service from the host storage clouds, and/or to the target step-down data stores from the data distribution service. A set of de-population commands can specify the connections, target data locations, file or directory formats, and/or other parameters to be used to re-locate the cloud-populated data.

24 Claims, 7 Drawing Sheets

(56) References Cited

OTHER PUBLICATIONS

Jeffrey Darcy, "Systems and Methods for Searching a Cloud-Based Distributed Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.
Jeffrey Darcy, "Systems and Methods for Dynamically Replicating Data Objects Within a Storage Network", U.S. Appl. No. 12/872,022, filed Aug. 31, 2010.
James Michael Ferris, "Systems and Methods for Stage Data Migration Between Data Sources and Cloud-Based Storage Network", U.S. Appl. No. 13/037,183, filed Feb. 28, 2011.
James Michael Ferris, "Systems and Methods for Generating Optimized Host Placement of Data Payload in Cloud-Based Storage Network", U.S. Appl. No. 13/118,075, filed May 27, 2011.
James Michael Ferris, "Systems and Methods for Migrating Data Among Cloud-Based Storage Networks Via a Data Distribution Service", U.S. Appl. No. 13/037,215, filed Feb. 28, 2011.
James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.
James Michael Ferris, "Systems and Methods for Establishing Upload Channels to a Cloud Data Distribution Service", U.S. Appl. No. 13/037,230, filed Feb. 28, 2011.
James Michael Ferris, "Methods and Systems to Automatically Extract and Transport Data Associated with Workload Migrations to Cloud Networks", U.S. Appl. No. 13/116,599, filed May 26, 2011.
James Michael Ferris, "Systems and Methods for Cloud Data Deployment Based on Preferential and/or Existing Subscription Relationships", U.S. Appl. No. 13/117,331, filed May 27, 2011.
James Michael Ferris, "Methods and Systems for Data Compliance Management Associated with Cloud Migration Events", U.S. Appl. No. 13/118,123, filed May 27, 2011.
James Michael Ferris, "Systems and Methods for Determining Consistencies in Staged Replication Data to Improve Data Migration Efficiency in Cloud Based Networks", U.S. Appl. No. 13/117,235, filed May 27, 2011.

\* cited by examiner

SYSTEMS AND METHODS FOR DE-POPULATING CLOUD DATA STORE

FIELD

The invention relates generally to systems and methods for de-populating a cloud data store, and more particularly, to platforms and techniques for extracting a set of cloud-populated data from host cloud data stores, and managing the transport and delivery of that data via a cloud data distribution service that can configure high-bandwidth connections, configure the data format or security, and/or other attributes of the data, transport channel, and/or recipient storage target.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In terms of data deployment and migration to the cloud, in cases, an administrator or other user may wish to consider transporting a set of data from a premise-based network into cloud-hosted storage, for instance to leverage the cost, consolidation, management tools, and/or other features or advantages of the cloud. In an unmodified or unaided cloud storage platform, relatively large-scale storage resources may be available for users wishing to upload their data assets into the cloud, but without any special or enhanced set of connections into the host storage clouds. In the case of relatively large-scale premise data stores, such as those maintained, merely for instance, by hospitals, government agencies, financial institutions, or other entities, the amount of data that needs to be transported may be in the range of terabytes, petabytes, or more. In the case of those comparatively large-scale data installations, an attempt to migrate the data over public Internet connections, such as packet-switched TCP/IP (transfer control protocol/Internet protocol) or FTP (file transfer protocol) connections, the delivery of the data payload could require days or weeks of time.

For many organizations, that type of transfer delay may be impractical or impossible. In addition, the relatively narrow-bandwidth connections available over the public Internet may not be secure, and for sensitive data or applications, the use of such connections may also not be a valid or practical option. Moreover, narrow-bandwidth connections into a host storage cloud may not allow for data management services such as error correction, in-flight encryption, or other security or management options.

In further cases, data which has been installed or hosted in one or more host storage clouds may eventually be desired to be removed or de-populated from those clouds. This can be the case, for instance, when some or all of the data hosted in the cloud has become obsolete or unusable, for instance, due to aging of the data itself, and/or the encoding of that data in file formats which are no longer supported by applications used in a user's cloud or other network.

It may be desirable to provide systems and methods for de-populating a cloud data store, in which cloud-populated data can be identified, located, and efficiently transported from the cloud to step-down data stores such as on-premise databases or servers, using a centralized cloud data distribution service capable of configuring connections to de-populate the cloud-hosted data, while manage the formatting, transfer, security, and/or other transport details using a set of selectable de-population commands and/or other instructions.

DESCRIPTION

Figure 1:
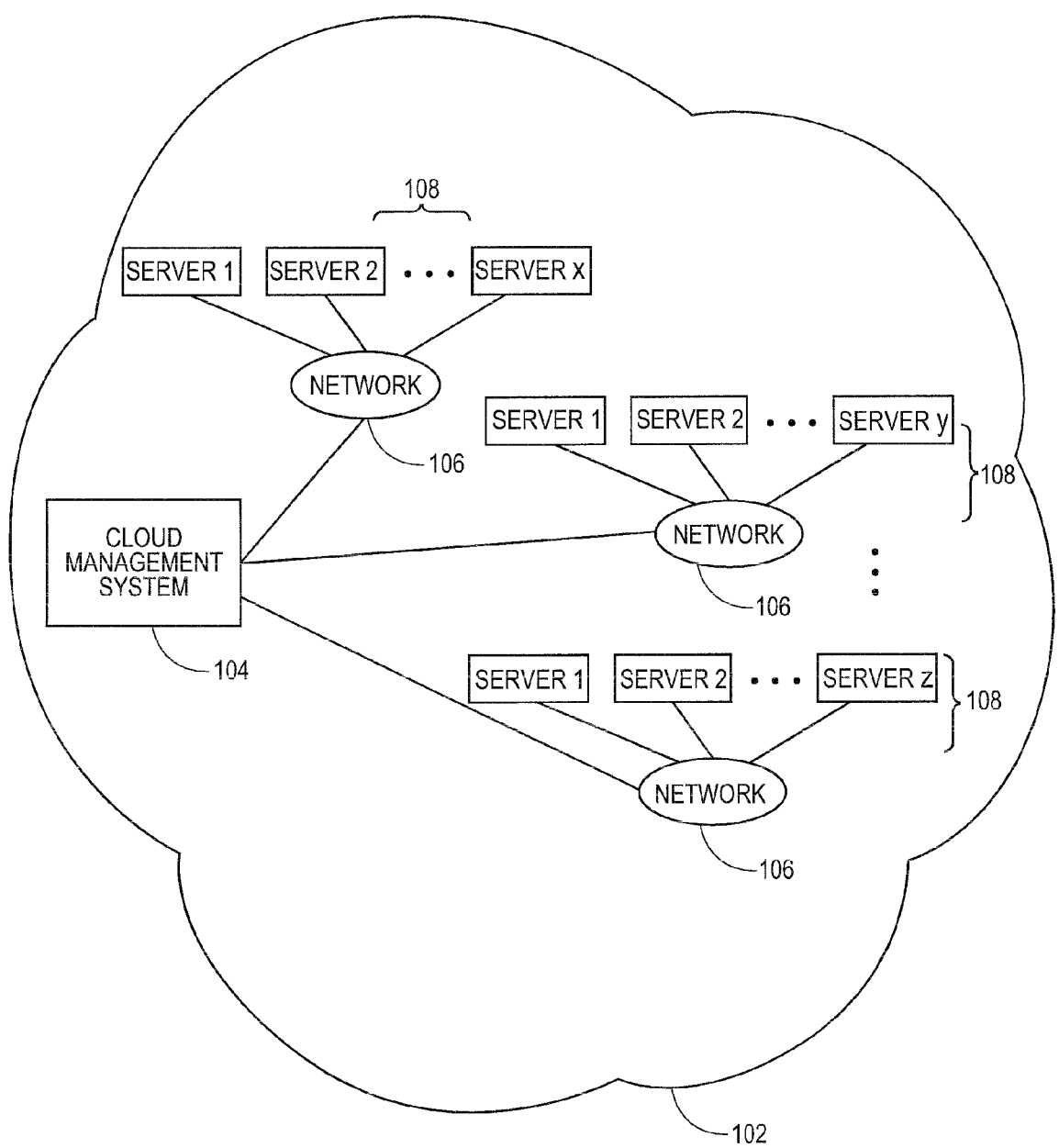
FIG. 1 illustrates an overall cloud system architecture in which various aspects of systems and methods for de-populating a cloud data store can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
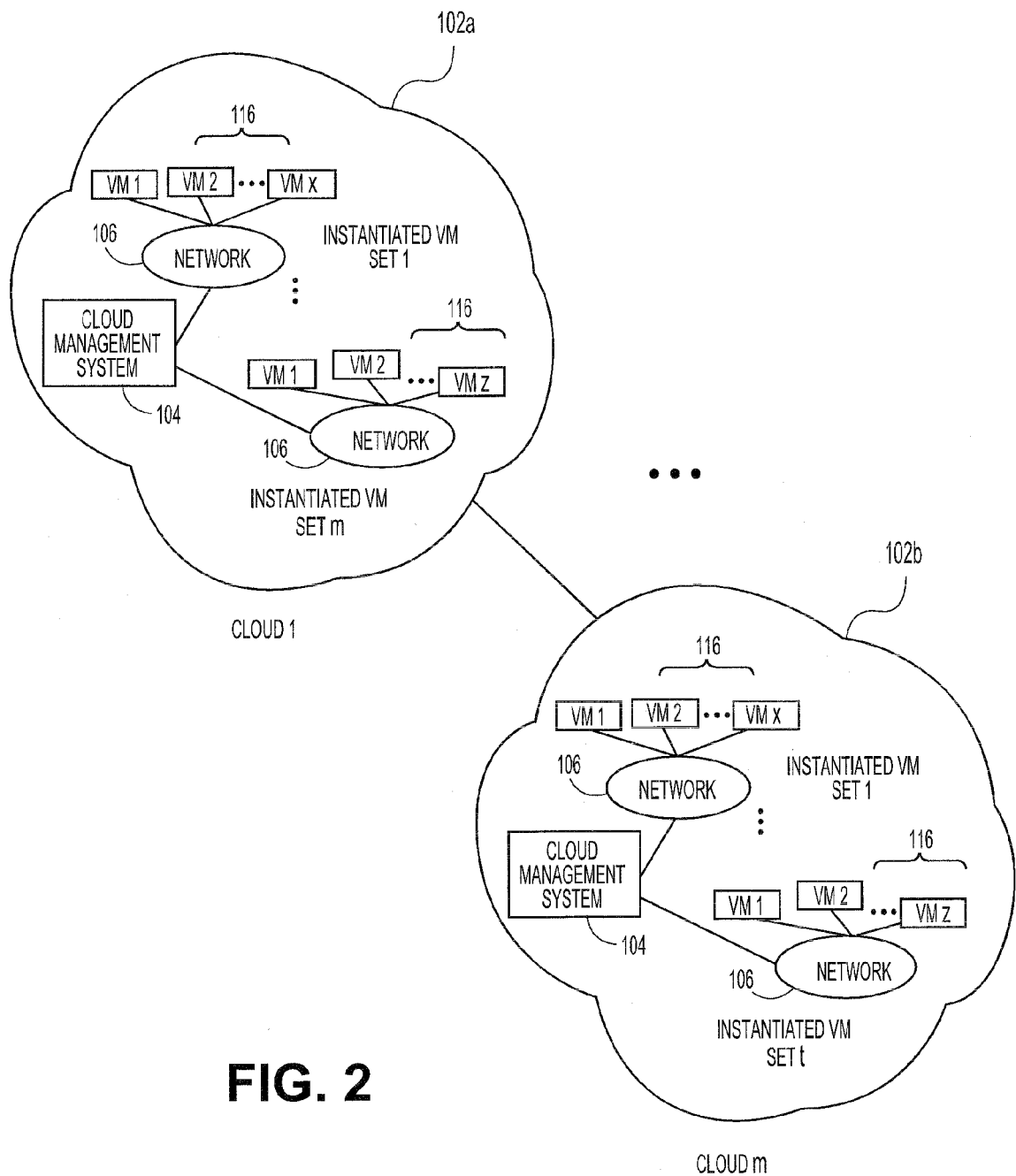
FIG. 2 illustrates an overall cloud system architecture in which various aspects of systems and methods for de-populating a cloud data store can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual store-front, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

In aspects, the cloud management system 104 and/or other logic or service that manages, configures, and tracks cloud activity can be configured to interact with other sites, platforms, engines, servers, and/or associated services that are configured to organize and manage the transport and delivery of existing data stores from on-premise databases or other sources, and stage that data to data storage resources at, near, co-hosted, or otherwise in geographic proximity to a set of host storage clouds in which that data payload will be placed and stored. In aspects, the cloud distribution data service (which may be referred to as "CDD", "CDD service," "data distribution service," or other references herein) can be located at the network edge to either or both of the premise data sources, and/or the set of host storage clouds. In aspects, this staging or staggering of potentially large-scale or very large-scale data stores can permit the connection between the data source(s), intermediate or staged data stores, and/or the host cloud data stores using dedicated and/or high-bandwidth lines, channels, or connections to permit the efficient and timely porting of that data to a host storage cloud or clouds of the user's choice. In aspects, the data payload or portions thereof can be located, extracted and transmitted as an image or copy of the subject data, with the original cloud-hosted being preserved in the set of host storage clouds. In aspects, the data payload and/or portions thereof can be located, extracted, and transmitted without leaving the original data stored in the set of host storage clouds, such as by deleting that data upon reading-out, or using other techniques.

Figure 3:
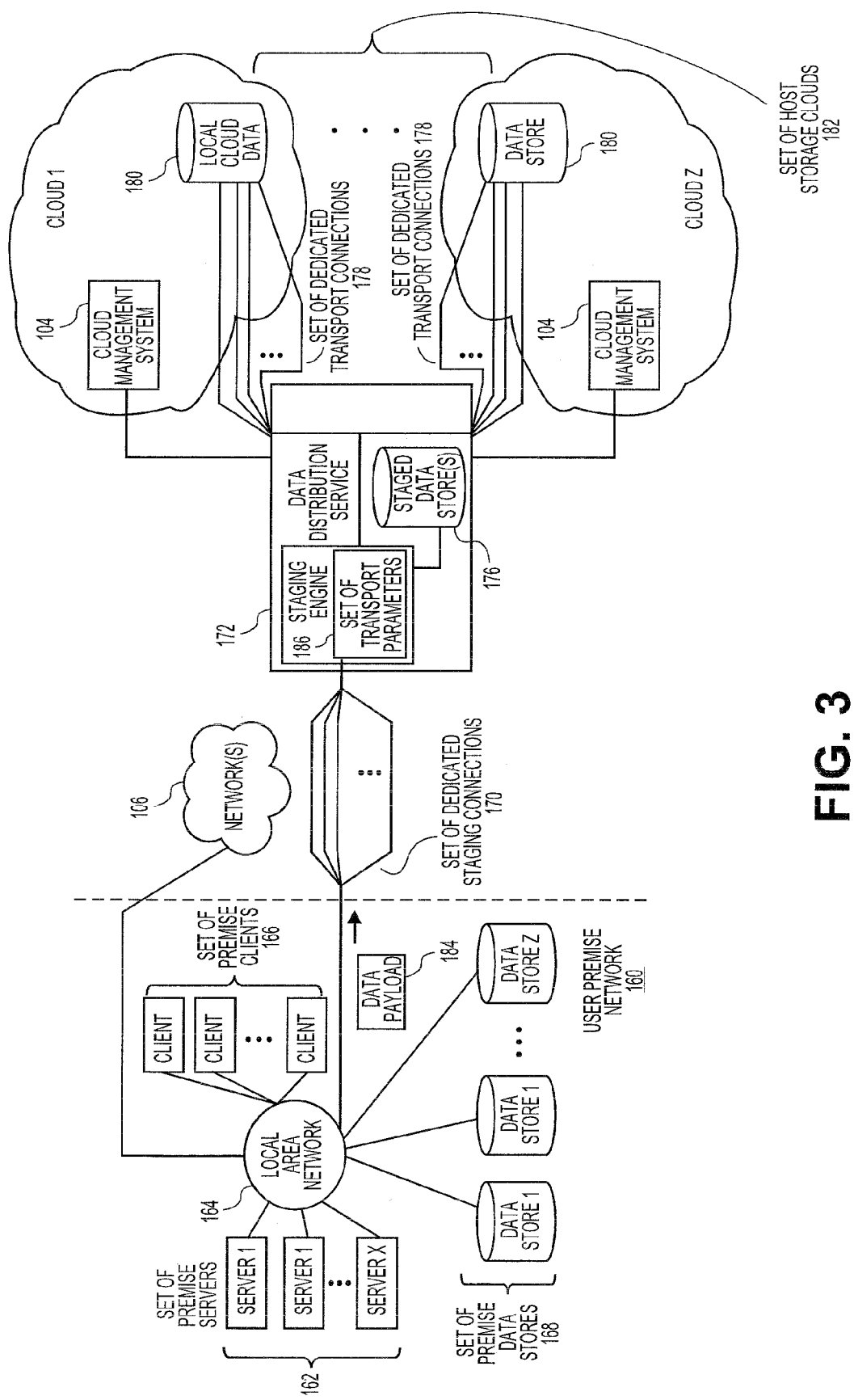
FIG. 3 illustrates a network configuration in which a data distribution service can be established between a premise network and host storage cloud, according to various embodiments.

In those regards, FIG. 3 illustrates a network implementation in which, in various cases, an administrator, owner, operator, and/or other user of a premise network 160 may wish to consider identifying, collecting, and migrating or transporting their databases, data files, and/or other data assets to a set of host storage clouds 182. In aspects and merely illustratively, the premise network 160 can contain or include on-premise, bare-metal, and/or other virtual or physical assets including a set of premise servers 162, a set of premise clients 166, one or more local area networks (LANs) 164 such as an Ethernet™ or Wifi™ network, a virtual private network (VPN), and/or other networks or connection topologies. The premise network 160 can include or interface to one or more networks 106, such as the public Internet and/or other public or private networks.

The premise network 160 can likewise include a set of premise data stores 168, such as one or more databases, data stores, servers, redundant arrays of inexpensive disks (RAID) installations, optical or solid-state storage or devices, and/or other data storage repositories, resources, or assets. In aspects, the set of premise data stores 168 can store different types of data, including, for example, technical, medical, financial, scientific, and/or other data. The data hosted or stored in the set of premise data stores 168 can comprise significantly or substantially large-scale data, for example data or files comprising terabytes or other amounts of data. For instance, the administrator, owner, operator, and/or other user of a corporation, hospital, educational institution, government body, and/or other entity may collect and maintain a set of data in a set of premise data stores 168 such as local databases, data centers, database files and/or engines, repositories, and/or other data assets, services, and/or other storage sites of resources. In cases, the set of premise data stores 168 can host and store a significant or substantial amount of data, such as terabytes, petabytes, exabytes, yottabytes, and/or other amounts of data. In aspects, the administrator, owner, operator, and/or other user responsible for hosting and/or maintaining that data in the set of premise data stores 168 may, for various reasons, wish to migrate some or all of that constituent data to one or more local cloud data stores 180 in the set of host storage clouds 182, such as to leverage cost, maintenance, capacity, security, and/or other advantages or factors available in the set of host storage clouds 182.

In aspects, it can be the case that if the owner, administrator, and/or other user of the user premise network 160 attempted to transport a significant amount of the data stored in the set of premise data stores 168 via one or more networks 106 such as the Internet in an unmanaged fashion, the comparatively low bandwidth or lack of reliability in the packet-switched public Internet could render the data transfer difficult, impractical, unfeasible, or impossible due to the limitations of those types of channels or connections. The upload of terabytes or other amounts of data over public Internet or similar connections could require days of time or more, and data integrity or reliability issues could also affect the effectiveness of data migration attempted in that manner.

According to aspects, systems and methods for staged data migration between data sources and cloud-based storage networks according to the present teachings can be deployed to assist in reducing, avoiding, or eliminating those and other types of performance degradations and other factors having a potential impact on the transport of data from on-premise and/or other sources to the set of host storage clouds 182 and/or other cloud-based storage assets, services, or resources. In implementations of the present teachings, a data distribution service 172 can accordingly be established or deployed as an independent service or access point, available publicly or privately to potential subscribers to the set of host storage clouds 182, to condition, prepare, receive, and stage incoming data payloads or data sets for delivery to an eventual cloud storage host, using enhanced, dedicated, and/or otherwise managed connections to reduce data transport time, to improve transfer reliability and/or security, and/or to provide other factors or benefits. In aspects, the data distribution service 172 can establish or maintain physical points of presence (PoPs) and/or other connections to one or more networks 106, such as the Internet and/or other public or private networks, through which users or potential users can connect to the data distribution service 172 and its associated resources, logic, and services. According to aspects, the data distribution service 172 can host or execute a staging engine 174 that can contain software application, operating system, and/or other logic or resources to manage the transport and delivery of a data payload 184 from the set of premise data stores 168 and/or other sources to a set of host storage clouds 182. In aspects, the data distribution service 172 can be configured to communicate directly or indirectly with the cloud management system 104 of each of the set of host storage clouds 182, for instance via the Internet and/or other public or private networks or connections. In aspects, the data distribution service 172 can also maintain a set of staged data stores 176, such as databases, data stores, servers, and/or other data assets or resources with which to store and stage the data payload 184 for migration into one or more local cloud data stores 180 hosted in the set of host storage clouds 182. In aspects, each cloud in the set of host storage clouds 182 can host one or multiple local cloud data stores 180.

According to implementations of the present teachings in certain regards, the data distribution service 172 can operate to manage, organize, and/or enhance or optimize the transfer of the data payload 184 from the set of premise data stores 168 and/or other sources by staggering, staging, pre-staging, conditioning, and/or otherwise manipulating and administering the transfer of the data payload 184 to the set of staged data stores 176 via sets of selectable and/or configurable channels or connections. In aspects, those channels or connections can be or include a set of dedicated staging connections 170 that connect the user premise network 160 to the data distribution service 172 and the set of staged data stores 176. In aspects, the set of dedicated staging connections 170 can be or include any one or more of asynchronous transfer mode (ATM) networks or connections, wide area networks (WANs) or connections, metropolitan area networks (MANs) or connections, fiber optical connections such as synchronous optical networking (SONET) or synchronous digital hierarchy (SDH) connections, wireless connections, cable or wireline connections, virtual private networks (VPNs) or connections, and/or other channels or connections, in aspects, the connections in the set of dedicated staging connections 170 can be or include channels or connections can having a relatively high-capacity bandwidth or service level, such as for instance tens of megabytes per second, hundreds of megabytes per second, gigabytes per second, tens of gigabytes per second, hundreds of gigabytes per second, terabytes per second, and/or other data transfer rates or bandwidth ratings or capacities. In aspects, any one or more of the connections or channels in the set of dedicated staging connections 170 can comprise connections which are leased by a user on a temporary, demand-triggered, long-term, and/or other basis. And one or more of the connections or channels in the set of dedicated staging connections 170 can be or include permanent or dedicated channels, line, and/or connections, dynamically routed or configured channels or connections, and/or other channels or connections.

In aspects, the administrator, owner, operator, and/or other user of the user premise network 160 can specify a set of conditions, criteria, and/or other parameters to govern the transport of the data payload 184 during delivery to the data distribution service 172 and/or to the eventual set of host storage clouds 182, which information can be stored or encoded in a set of transport parameters 186, which can be stored in the staging engine 174 and/or other locations or stores. The set of transport parameters 186 can, for instance, specify a total amount of data to be include in the data payload 184 for delivery to the data distribution service 172, as well as a schedule over which or time by which the administrator, owner, operator, and/or other user wishes to conduct and complete the migration of the data payload 184 to the data distribution service 172. The set of transport parameters 186 can likewise include cost specifications, for instance, in cases where the cost of leasing or using any of the set of dedicated staging connections 170 is selectable or variable. The set of transport parameters 186 can also include further configuration parameters, such as any security or redundancy protocols or standards that the administrator, owner, operator, and/or other user wishes to apply to the transport of the data payload to the data distribution service 172, user access controls to the data payload 184 before or after transport has been initiated or completed. Other parameters, configuration settings, commands, scripts, and/or other criteria, variables, or conditions can be specified or indicated in the set of transport parameters 186.

As a merely illustrative example, the administrator, owner, operator, and/or other user can enter or encode the set of transport parameters 186 to indicate that a data transport event is desired to migrate the data payload 184 from the user premise network 160 under criteria that 1,000 terabytes of data is to be transported by an ending time of 12:00 midnight on a specified data, at an average cost of not more than $ 0.25 per megabyte and with the data payload 184 encrypted using the Data Encryption Standard (DES) and/or other encryption or security protocol, and with the data payload 184 to be stored in the set of staged data stores 176 of the data distribution service 172 in XML (extensible markup language) or other format. The set of transport parameters 186 can be selected, entered, and/or otherwise transmitted from the user premise network 160 or other site to the data distribution service 172, for instance via a selector tool, Web browser, and/or other application or interface. The set of transport parameters 186 can, in aspects, in whole or part specify the set of dedicated staging connections 170 to be used for delivery of the data payload 184 and/or associated information to the data distribution service 172, for instance via manual selection or input received from the administrator, owner, operator, and/or other user.

In aspects, the data payload 184 and/or associated information can be migrated or transported partly or entirely via the set of dedicated staging connections 170. For instance, in cases, the administrator, owner, operator, and/or other user may transmit some of the data payload 184 and/or associated information via the one or more networks, in addition to the set of dedicated staging connections 170. For example, configuration commands, the set of transport parameters 186 or portions of or updates to the set of transport parameters 180, can be transmitted via the one or more networks 106, for instance via the public Internet, since in aspects comparatively higher-bandwidth connections may not be necessary to transmit relatively small amounts of commands and/or data or elements of the data. In cases, the one or more networks 106 can in addition or instead transport at least a portion of the data payload 184, for instance, to transmit supplemental data or attributes whose delivery target time is not immediate or a high priority. Other combinations of the one or more networks 106, the set of dedicated staging connections 170, other networks or connections, and/or combinations thereof can be used.

In aspects, after transport of the data payload 184 to the set of staged data stores 176 of the data distribution service 172 has been completed, the data distribution service 172 can finalize the installation, storage, and/or hosting of the data payload 184 and/or associated information in the one or more local cloud data stores 180 before initiating activities related to further transport of the data payload 184 to the one or more local cloud data stores 180 of one or more of the set of local host storage clouds 182. The data distribution service 172 can store, host, and maintain the data payload 184 in the set of staged data stores 176 for temporary, short-term, and/or longer or other periods, depending on the set of transfer parameters 186 and/or other factors. For instance, the staging engine 174 of the data distribution service 172 can determine that the administrator, owner, operator, and/or other user has specified or requested that the transfer of the data payload 184 into the one or more local cloud data stores 180 of one or more of the set of local host storage clouds 182 be initiated by 9:00 p.m. on a certain date. To satisfy that scheduling criterion, the staging engine 174 can identify the size and/or type of data in the data payload 184, analyze or estimate the bandwidth available in the set of dedicated staging connections 170, and set a target delivery completion time of 11:00 p.m. on the specified delivery date, taking into account the interval of time that will be necessary to transport the data payload 184 over the available bandwidth of the selected channels in the set of dedicated staging connections 170 to complete transfer of the data payload 184 by 11:00 p.m. on that scheduled date. If the transport process proceeds to complete by the calculated completion time of 11:00 p.m. on that date, the data of the data payload 184 and/or any associated information can accordingly reside in the set of staged data stores 176 of the data distribution service 172 for one hour before the staging engine 174 initiates the further or next-stage migration or transport of the data payload 184 to the one or more local cloud data stores 180 of one or more of the set of local host storage clouds 182. The set of staged data stores 176 of the data distribution service 172 can host the data payload 184 and/or associated information for lesser or greater amounts of times, for instance, for periods of minutes, hours, days, weeks, months, and/or other periods or intervals, depending on the set of transfer parameters 186 and/or other factors. For instance, in an illustrative implementation involving payload data 184 including enterprise resource planning (ERP) data related to a chemical or automotive factory, the manufacturing data, materials deliveries and costs, factory repair or maintenance events or schedules, and/or other data may be tracked, stored, and updated on a monthly cycle. In those or other implementations, the administrator, owner, operator, and/or other user may specify that the data payload 184 encapsulating that ERP and/or other data can or should be migrated over a period of 30 days and/or before the next regular update cycle, in which case the data distribution service 172 may determine that the data payload 184 can be extracted to the data distribution service 172 over a period of 30 days, for instance so as to use a comparatively lower amount of bandwidth in the set of dedicated staging connections 170 and thereby incur less connection leasing costs. In cases where the set of staged data stores 176 of the data distribution service 172 stores, hosts, and/or maintains the data payload 184 over significant intervals of time, such as days or weeks of time, and/or other intervals or periods, the data distribution service 172 can also apply or enforce data conditioning or maintenance standards or procedures on the data payload 184 or other information. For example, in cases where the data payload 184 includes medical information, the data distribution service 172 can apply user access controls such as username/password authentication and/or data encryption, for instance to satisfy the requirements of the Health Insurance Portability and Accountability Act (HIPPA), the requirements of the Sarbanes-Oxley Act (SOX), or other regulatory or compliance stipulations or requirements. Other compliance, management, and/or security protocols can be applied to the data payload 184 and/or other information stored in the set of staged data stores 176 of the data distribution service 172, regardless of the duration of time that information is staged in the data distribution service 172. For instance, during the period that the data payload 184 resides or is hosted in the data distribution service 172, the data distribution service 172 can also communicate with the user premise network 160 to interrogate that source network for any incremental or other updates to the data payload 184, and incorporate those updates into the data payload 184 stored in the set of staged data stores 176 of the data distribution service 172. Other data conditioning or processing can be performed on the data payload 184 while hosted or stored in the set of staged data stores 176 of the data distribution service 172.

In aspects, the data distribution service 172 can be installed, configured, and/or located in geographic proximity to the set of host storage clouds 182, the one or more local cloud data stores 180, and/or other network elements or sites. As used or described in this application, in aspects, locations within geographic proximity to each other can be or include locations or sites located within the same city or metropolitan area, and/or within the same general region, such as within a state in the U.S. and/or a multi-state region generally recognized as constituting a cohesive geographic region, such as, merely for example, the New York-New Jersey-Connecticut tri-state area, and/or others. In aspects, locations within geographic proximity to each other can also or instead be or include areas or regions within which direct, continuous, connectable, configurable, leasable, primary, and/or otherwise uninterrupted or unmediated physical or wireless connections are available to establish communications links between two or more network points, sites, and/or entities within a geographic region, section, and/or area. In aspects, network sites, points including physical points of presence (PoPs), and/or other elements can be considered to be within geographic proximity to each other is those sites or points can be connected directly or essentially directly via comparatively high-bandwidth channels or connections, and/or without resorting to connections via the public Internet. For example, network sites, points including physical points of presence (PoPs), and/or other elements can be considered to be within geographic proximity to each other if those sites, points, and/or other elements can be connected directly or essentially directly via one or more wide area networks (WANs), metropolitan area networks (MANs), optical connections such as synchronous optical network (SONET) connections, and/or other comparatively high-bandwidth channels or connections, as will be understood by persons skilled in the art. While in aspects network sites, points including physical points of presence (PoPs), and/or other elements can be considered as being within geographic proximity based on various physical, functional, and/or logical factors, in aspects, and purely illustratively, network sites, points including physical points of presence (PoPs), and/or other elements that can be classified or considered as being within geographic proximity can be located within distances of miles, tens of miles, hundreds of miles, and/or lesser or greater distances of each other. In aspects, in noted instances and others, geographic proximity can also encompass or include network proximity between the premise network 160 and the data distribution service 172, and/or between the data distribution service and set of host storage clouds 182, in the sense of being within range or being connectable via comparatively high-bandwidth connections or channels. Other factors, parameters, criteria, and/or considerations can be used to determine geographic proximity between network sites, points including physical points of presence (PoPs), and/or other elements as described herein.

Upon meeting, reaching, and/or otherwise satisfying the scheduled time, criteria, and/or conditions to initiate the further transfer of the data payload 184 and/or associated information to the set of host storage clouds 182, the data distribution service 172 and/or other logic or service can begin the processing to migrate that data or information to the one or more local cloud data stores 180 of one or more clouds in the set of host storage clouds 182. In aspects, the delivery of the data payload 184 and/or associated information to the set of host storage clouds 182 can be initiated at a scheduled time, such as a time specified in the set of transport parameters 186 and/or other commands or configuration data. In aspects, the delivery of the data payload 184 and/or associated information to the set of host storage clouds 182 can be initiated on an event-triggered basis, such as one hour or one day after completion of the transport of the data payload 184 to the data distribution service 172. In aspects, the delivery of the data payload 184 and/or associated information to the set of host storage clouds 182 can also or instead be initiated by manual selection or command, for instance, by a selection or command inputted by the administrator, owner, operator, and/or other user. Other conditions, commands, schedules, events, and/or criteria can be used to identify a time at which to begin, pause, continue, and/or otherwise deliver the data payload 184 and/or associated information from the data distribution service 172 to the one or more local cloud data stores 180 of one or more clouds in the set of host storage clouds 182.

In aspects, the data payload 184 and/or other information can be transported or transmitted through a data transport pathway from the data distribution service 172 to the set of host storage clouds 182 via a set of dedicated transport connections 178. In aspects, the set of dedicated transport connections 178 can connect the set of staged data stores 176 directly or indirectly to the one or more local cloud data stores 180 to migrate and install the data payload 184 and/or associated information in the one or more local cloud data stores 180. In aspects, the set of dedicated transport connections 178 can be or include connections or channels of the same general type or types as the set of dedicated staging connections 170, and/or can include additional, separate, and/or different channels or connections. In aspects, the set of staged data stores 176 can be located within geographic proximity or near-geographic proximity, in the senses noted herein, to one or more of the clouds in the set of host storage clouds 182 and/or the constituent elements of those clouds, including the cloud management system(s) 104 and/or one or more local cloud data stores 180. In aspects, the staging engine 174 and/or other logic or service can initiate and manage the transfer of the data payload 184 and/or image thereof stored or hosted in the set of staged data stores 176 to the one or more local cloud data stores 180 via the set of dedicated transport connections 178 on a scheduled, event-triggered, manually-specified, and/or other basis. The migration or transport of the data payload 184 and/or associated data can for instance be programmed to begin at a specified time on a specified date, and/or to begin upon the detection of specified events, such as validation of the data payload 184 and/or associated data using error correction, decryption, and/or other processing or protocols. In aspects, the migration or transport of the data payload 184 and/or associated data can be initiated by receipt of a command, input, and/or other signal from the administrator, owner, operator, and/or other user, for instance, received via a tool, interface, or browser operated by the admin in the user premise network 160 and/or other location or site.

After the transfer of the data payload 184 and/or other associated data has been initiated, the staging engine 174 and/or other logic or service can monitor the transport of that data while in-flight, for instance, to perform data validation of migrated data using for instance check-sum or other processing, encryption/decryption of the data while traversing the set of dedicated transport connections 178, and/or to perform other supervisory or monitoring tasks to ensure the integrity of the data being moved and the migration process. After the successful completion of all data transport, validation, security, and/or other processing required for migration of the data payload 184 and/or related information, the staging engine 174 can detect, confirm, and/or declare the completion of the transfer of the data payload 184 and/or associated information to the set of host storage clouds 182. In aspects, the staging engine 174, one or more cloud management system(s) 104, and/or other logic can store and/or encode the data payload 184 and/or associated information in the one or more local cloud data stores 180 in various formats or configurations, such as, for example, any one or more of a database including relational databases, an object-oriented data object such as an extensible markup language (XML)-based object, a table, tree, linked list, and/or other data object, format, file, and/or configuration. In aspects, the staging engine 174 can also perform any post-transfer activities that may be selected or required to complete the installation and storage of the data payload 184 and/or related information in the set of host storage clouds 182. In aspects, for instance, the the staging engine 174 and/or other logic or service can communicate with the user premise network 160 to indicate that the data payload 184 and/or associated information has been safely and/or completely migrated to the data distribution service 172, upon which notification the user premise network 160 can perform other actions, such as to delete and/or archive the data of the data payload 184 from the set of premise data stores 168. Other actions can be taken by or in the user premise network 160.

For instance, upon completion of the data transport process, the staging engine 174 and/or other logic or service can likewise communicate with the cloud management system(s) 104 of one or more of the set of host storage clouds 182 to notify the one or more cloud management system(s) 104 of the installation and presence of the data payload 184 and/or associated data in the one or more local cloud data stores 180 of one or more of the clouds in the set of host storage clouds 182.

In aspects, after the successful or completed transport of the data payload 184 and/or associated information to the set of host storage clouds 182, the staging engine 174, cloud management system(s) 104, and/or other logic or service can for instance register the data payload 184 and/or associated data in the file storage system or systems used by the one or more cloud management system(s) 104 and/or set of host storage clouds 182. In aspects, registration of the data payload 184 and/or associated data in corresponding file storage system or systems maintained or operated by the one or more cloud management system(s) 104 and/or set of host storage clouds 182 can permit, for instance, virtual machines, operating systems, applications, and/or other software, services, and/or users of the set of host storage clouds 182 and/or other clouds or networks to access, read, retrieve, write, modify, and/or otherwise process the data payload 184 and/or associated information directly from or via the set of host storage clouds 182. In aspects, the staging engine 174 and/or other logic or service can at such times or at other times de-activate, release, and/or otherwise terminate some or all of the set of dedicated staging connections 170 and/or set of dedicated transport connections 178, as desired or scheduled.

Figure 4:
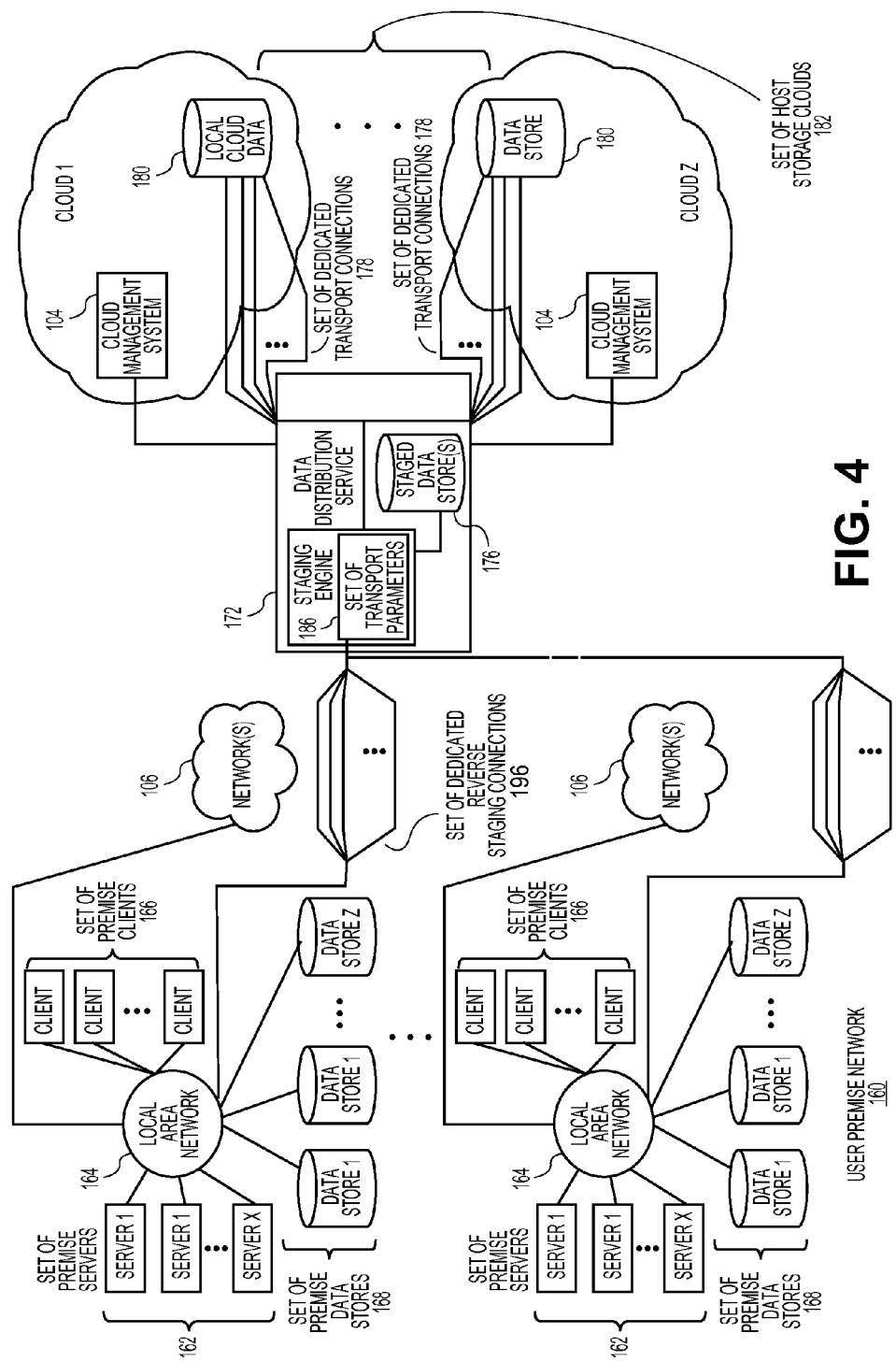
FIG. 4 illustrates a network configuration in which a data distribution service can be established between a cloud data delivery serviced and a set of step-down data stores and/or other storage targets, according to various embodiments in further regards.

In aspects, and as for Instance generally illustrated in FIG. 4, scenarios may arise or apply where one or more network administrators, owners, and/or other users have migrated, instantiated, installed, and/or otherwise stored or hosted a set of cloud-populated data 190 in a set of host storage clouds 182. In cases, the administrator, owner, operator, and/or other user of the set of cloud-populated data 190 can choose to extract or remove some or all of the set of cloud-populated data 190 from the set of host storage clouds 182, and distribute that data to a set of step-down data stores 194. The set of step-down data stores 194 can be or include target databases, data centers, local area networks (LANs), servers, optical storage, and/or other data storage sites of resources to which the administrator, owner, operator, and/or other user wishes to transport some or all of their cloud-hosted data. That may be the case, for instance, because that data has become obsolete, because the data relates to transactions or activities from a significant period of time ago which is not presently necessary to maintain in an accessible site or format. Other factors can contribute to a decision to migrate some of all of a set of cloud-populated data 190 to a set of step-down data stores 194. In aspects, one or more of the step-down data stores 194 can be located within a set of user premises 198, such as local area networks (LANs), virtual networks, and/or other networks, sites, and/or locations.

In aspects, the administrator, owner, operator, and/or other user can initiate the de-population of the set of cloud-populated data 190 from the set of host storage clouds 182 by issuing or initiating a set of de-population commands 192, for instance, by entering, selecting, or initiating those commands via a browser and/or other interface, service, site, or tool. In aspects, the set of de-population commands 192 can be or include a specification of the set of cloud-populated data 190 which the administrator, owner, operator, and/or other user wishes to extract and transfer from the set of host storage clouds 182, for example by including data or files names, addresses, directories, locations, content, and/or other attributes or criteria. The staging engine 174 can discover, identify, locate, and/or otherwise identify the selected set of cloud-populated data 190, for instance by performing a look-up of file or data directories, addresses, or other locations in a file storage system.

In aspects, the set of de-population commands 192 can also specify a data transport pathway including one or more of a set of dedicated transport connections 178 between the set of host storage clouds 182 and the data distribution service 172, in cases where the selected set of cloud-populated data 190 will be transferred to the data distribution service 172, as an intermediate step. The set of de-population commands 192 can also or instead specify criteria by which the staging engine 174 can construct a data transport pathway by selecting one or more connections in the set of dedicated transport connections 178, such as for instance indicating a set of cost parameters, a data transport schedule, bandwidth requirements, and/or other criteria by which to select one or more connections in the set of dedicated transport connections 178. In aspects, the set of de-population commands 192 can also include a specification of one or more connections in the set of dedicated reverse staging connections 196 between the data distribution service 172 and the set of step-down data stores 194 as part of the data transport pathway. As with the set of dedicated transport connections 178, the set of de-population commands 192 can specify individual channels or connections, and/or criteria by which those channels or connections can be selected in the set of dedicated reverse staging connections 196, including cost, schedule, bandwidth, and/or other factors.

In aspects, in addition to or instead of generating a transport path via the set of dedicated transport connections 178 to the data distribution service 172 and from there to the set of step-down data stores 194 via the set of dedicated reverse staging connections 196, the staging engine 174 and/or other logic or service can also establish or configure a data transport pathway including connections from the set of host storage clouds 182 directly to the set of step-down data stores 194 via the set of dedicated transport connections 178, the set of dedicated reverse staging connections 196, combinations, connections between, or extensions of the same, and/or other channels or connections.

Figure 5:
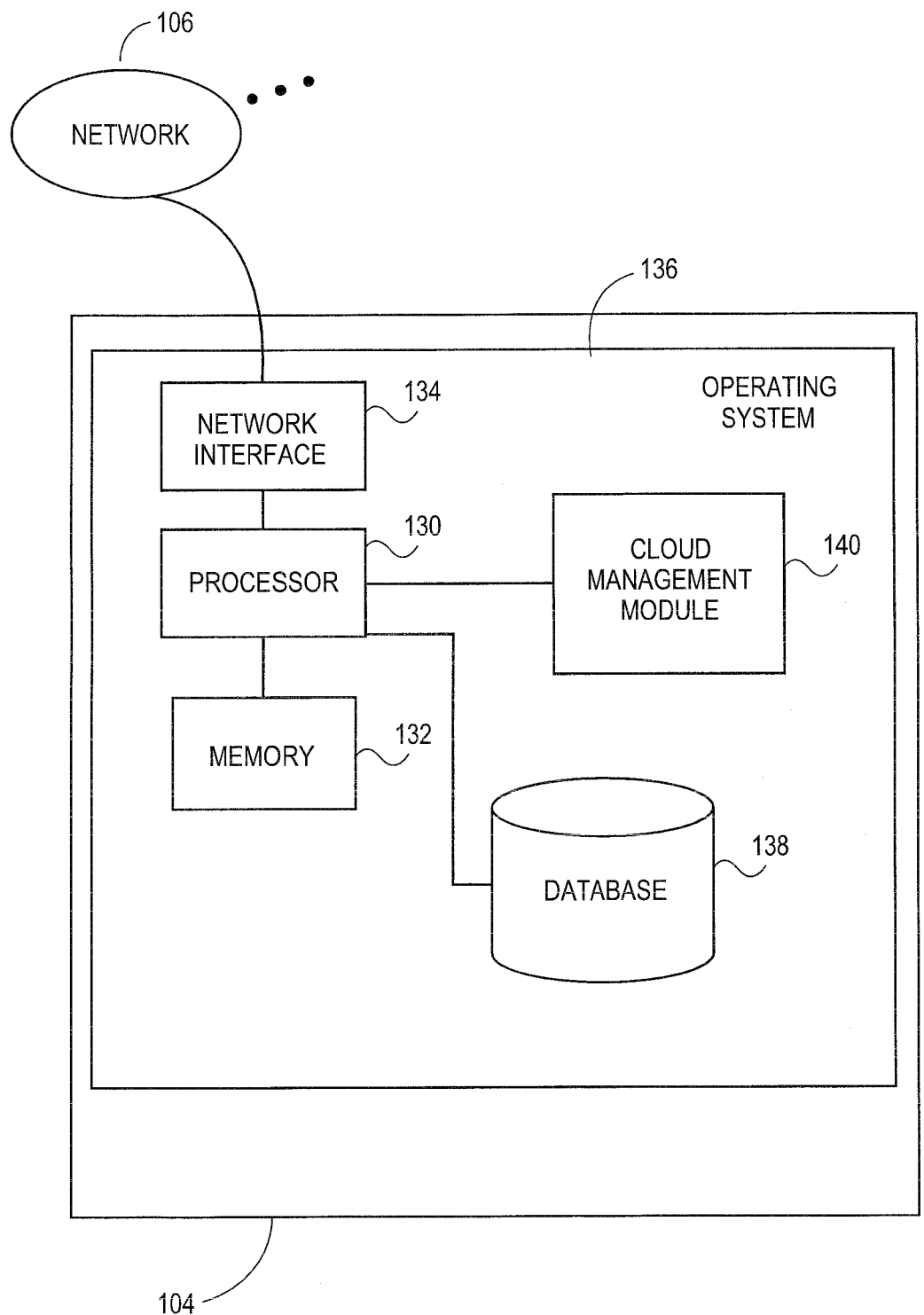
FIG. 5 illustrates an exemplary hardware configuration for a cloud management system that can support and maintain one or more cloud-based networks, according to various embodiments.

FIG. 5 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 152, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with workload management module 140, and/or other interfaces, applications, services, and/or logic. Other configurations of the cloud management system 104, associated network connections, and other hardware, software, and service resources are possible. It may be noted that in embodiments, the data distribution service 172 and/or components thereof such as the staging engine 174, and/or other hardware machines, platforms, or engines can comprise the same or similar resources as cloud management system 104, or can be configured with different hardware and software resources.

Figure 6:
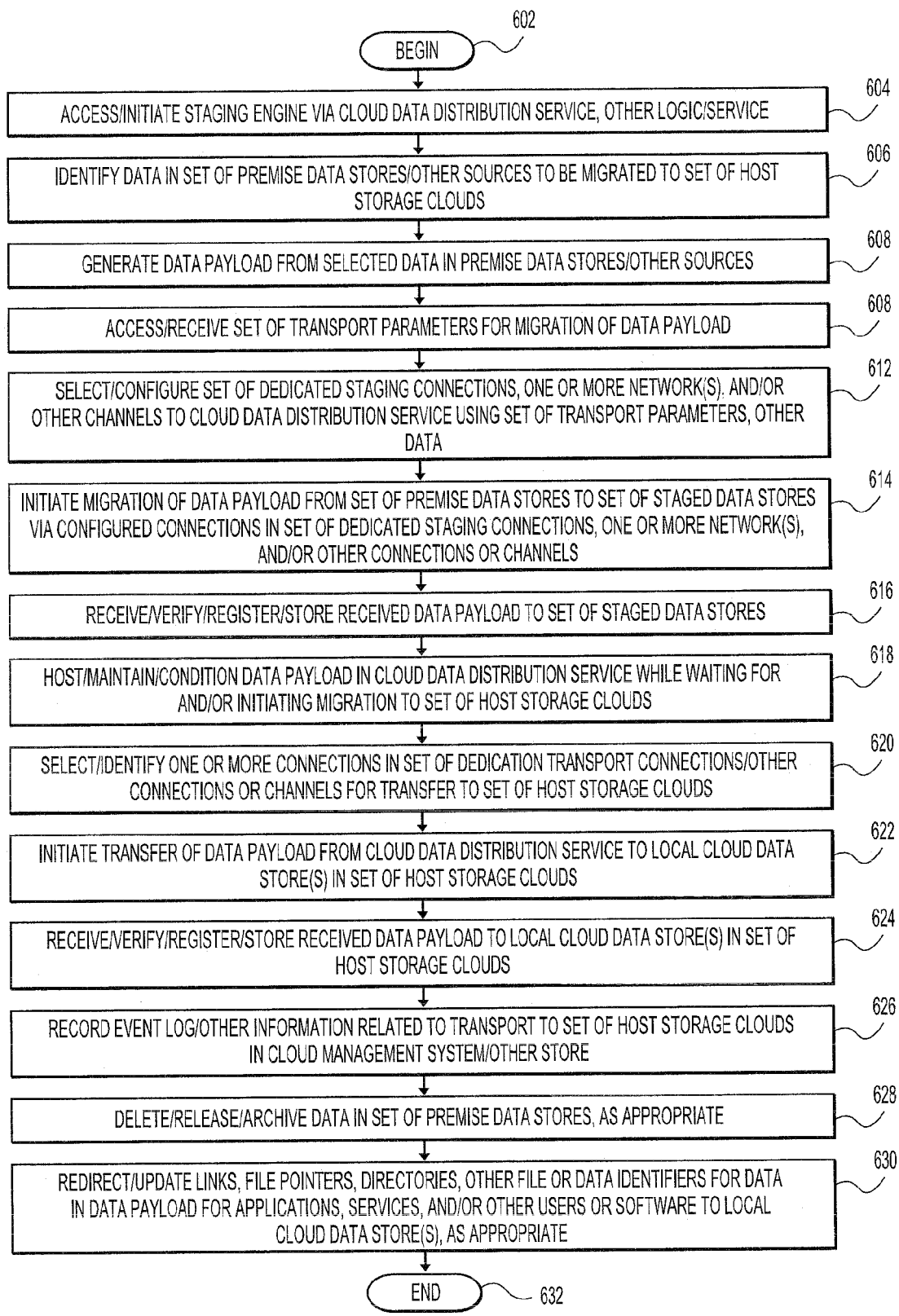
FIG. 6 illustrates a flowchart for data extracting, staging, and delivery processing via an intermediate or independent data delivery service, according to various embodiments.

In terms of delivery or upload of data into the set of host storage clouds 182, FIG. 6 illustrates a flowchart of overall processing that can be used to identify, queue, stage, and/or otherwise transport or manage the data payload 184 and/or other data or information, according to various aspects of the present teachings. In 602, processing can begin. In 604, the staging engine 174 can be accessed and/or initiated, for instance via the data distribution service 172 and/or other logic or service. In 606, the staging engine 174 and/or other logic or service can identify the data in the set of premise data stores 168 and/or other data sources too be migrated to the set of host storage clouds 182. In aspects, the data in the set of premise data stores 168 to be migrated can be identified via user selection or input, automatically via applications or services, and/or using other techniques, inputs, or criteria. In 608, the data distribution service 172 and/or other logic or service can generate, discover, inventory, and/otherwise identify the data to comprise the data payload 184 from the data selected in the set of premise data stores 168 and/or other data stores or sources. In 610, the staging engine 174 can access and/or receive the set of transport parameters 186 for the migration of the data payload 184. In aspects, the set of transport parameters 186 can specify, encode, store, and/or otherwise indicate the variables and/or configuration settings to be used to initiate, conduct, and manage the transport of the data payload 184 to the data distribution service 172 and/or to the eventual one or more local cloud data store(s) 180 in the set of host target clouds 182. In aspects, the set of transport parameters 186 can, for instance, include values for the size of the data to be extracted into the data payload 184, the format or encoding of the data to be extracted into the data payload 184, the language or other attributes of the data payload 184, the schedule by which the transport of the data payload 184 is to be conducted, selected and/or preferred connections by which the transport of the data payload 184 is to be conducted, user names or other identifiers for administrator, owner, operator, and/or other user to have access and/or management privileges during the transport of the data payload 184, and/or other parameters, settings, and/or variables.

In 612, the staging engine 174 and/or other logic or service can select, identify, and/or configure the set of dedicated staging connections 170, as well as one or more networks 106, and/or other channels or connections to the data distribution service 172 using the set of transport parameters 186 and/or other data. For example, the set of transport parameters 186 and/or other data can identify the vendors, carriers, and/or services or providers of the set of dedicated staging connections 170 and/or other channels or connections. For example, the set of transport parameters 186 and/or other data can identify the bandwidth capacities or classes of the set of dedicated staging connections 170 and/or other channels or connections, for example to permit the staging engine 174 and/or other logic or service to select channels or connections from amongst the set of dedicated staging connections 170 and/or other channels or connections that satisfy those or other specifications. In 614, the staging engine 174 and/or other logic or service can initiate the migration, transfer, or transport of the data payload 184 and/or associated information from the set of premise data stores 168 and/or other data stores or sources to the set of staged data stores 176 via the configured or selected connections in the set of dedicated staging connections 170, one or more networks 106, and/or other connections or channels. In aspects, the data transport can be initiated by transmitting one or more commands, messages, or signals from the staging engine 174 to the user premise network 160, the set of dedicated staging connections 170, and/or other network elements, sites, or services. In 616, the staging engine 174 and/or other logic or service can receive, verify, register, and/or store the received data payload 184 and/or associated information in or to the set of staged data stores 176 and/or other data stores or resources. In aspects, the set of staged data stores 176 can be or include data bases, server and/or storage farms, data centers, and/or other data hosting facilities co-hosted, co-located, located within geographic proximity to, and/or otherwise integrated with the data distribution service 172. In aspects, the staging engine 174 and/or other logic or service can, in instances, preserve or maintain the data format or configuration in the data payload 184 and/or associated information in the set of staged data stores 176 that was used in the storage of the same or similar data in the user premise network 160 and/or other data source. In aspects, the staging engine 174 and/or other logic or service can, in instances, also or instead update or modify the data format or configuration in the data payload 184 and/or associated information in the set of staged data stores 176 that was used in the storage of the same or similar data in the user premise network 160 and/or other data source.

In 618, the staging engine 174 and/or other logic or service can host, maintain, and/or otherwise manage or condition the data payload 184 and/or associated information in the data distribution service 172, while waiting for and/or initiating the migration of that data out of the data distribution service 172 to the set of host storage clouds 182. In aspects, the staging engine 174 and/or other logic or service can enforce privacy or access controls, such as to apply an access control list (ACL) to govern access to the data payload 184 and/or other associated information while stored or hosted in the data distribution service 172. In 620, the staging engine 174 and/or other logic or service can select and/or identify one or more connections in the set of dedicated transport connections 178 and/or other connections or channels for transfer of the data payload 184 and/or other associated information to the set of host storage clouds 182 and their associated storage resources. In aspects, the set of dedication transport connections 178 can be or include channels or connections of the same general type or types as the set of dedicated staging connections 170, and/or can be or include different or additional channels, connections, and/or services. In aspects, the set of dedicated transport connections 178 can be located within geographic proximity to some or all of the one or more local cloud data stores 180 of one, some, or all clouds in the set of host storage clouds 182, in the same senses described herein. In 622, the staging engine 174 and/or other logic or service can initiate the transport or transfer of the data payload 184 and/or associated information from the set of staged data stores 176 and/or other data sources of the data distribution service 172 to the one or more local cloud data stores 180 in or of the set of host storage clouds 182. For instance, the transport process can be initiated by or via a set of commands or instructions sent from the staging engine 174 to the cloud management system(s) 104 of the set of host storage clouds 182, by automatic initiation at scheduled times and/or based on programmed or predetermined conditions, and/or via other activation mechanisms. In 624, the one or more local cloud data stores 180 of one or more clouds in the set of host storage clouds 182 and/or other logic or service can receive, verify, register, encode, and/or otherwise store the data payload 184 and/or associated information. In aspects, for instance, the cloud management system(s) 104 of the corresponding clouds in the set of host storage clouds 182 can register or record the entry of the data payload 184 and/or associated information in a file storage system, such as a directory and/or other type of file or data record. In 626, the staging engine 174, one or more cloud management system(s) 104, and/or other logic or service can record an event log and/or other tracking information related to the transport of the data payload 184 and/or other information to the set of host storage clouds 182 in or to the cloud management system(s) 104 and/or other data store or stores. In 628, the staging engine 174, user premise network 160, cloud management system(s) 104, and/or other logic or service can delete, release, mark, de-activate, and/or otherwise archive or process the data corresponding to the data payload 184, and/or associated data, in or from the set of premise data stores 168. In 630, the staging engine 174, cloud management system(s) 104, and/or other logic or service can redirect and/or update one or more links, file names, file pointers, directories, and/or other file or data identifiers for data in the data payload 184 and/or associated information to indicate data storage locations in the one or more local cloud data stores 180 for the use of or access by applications, services, and/or other users or software. In 632, processing can repeat, return to a prior processing point, jump to a further processing point, or end.

Figure 7:
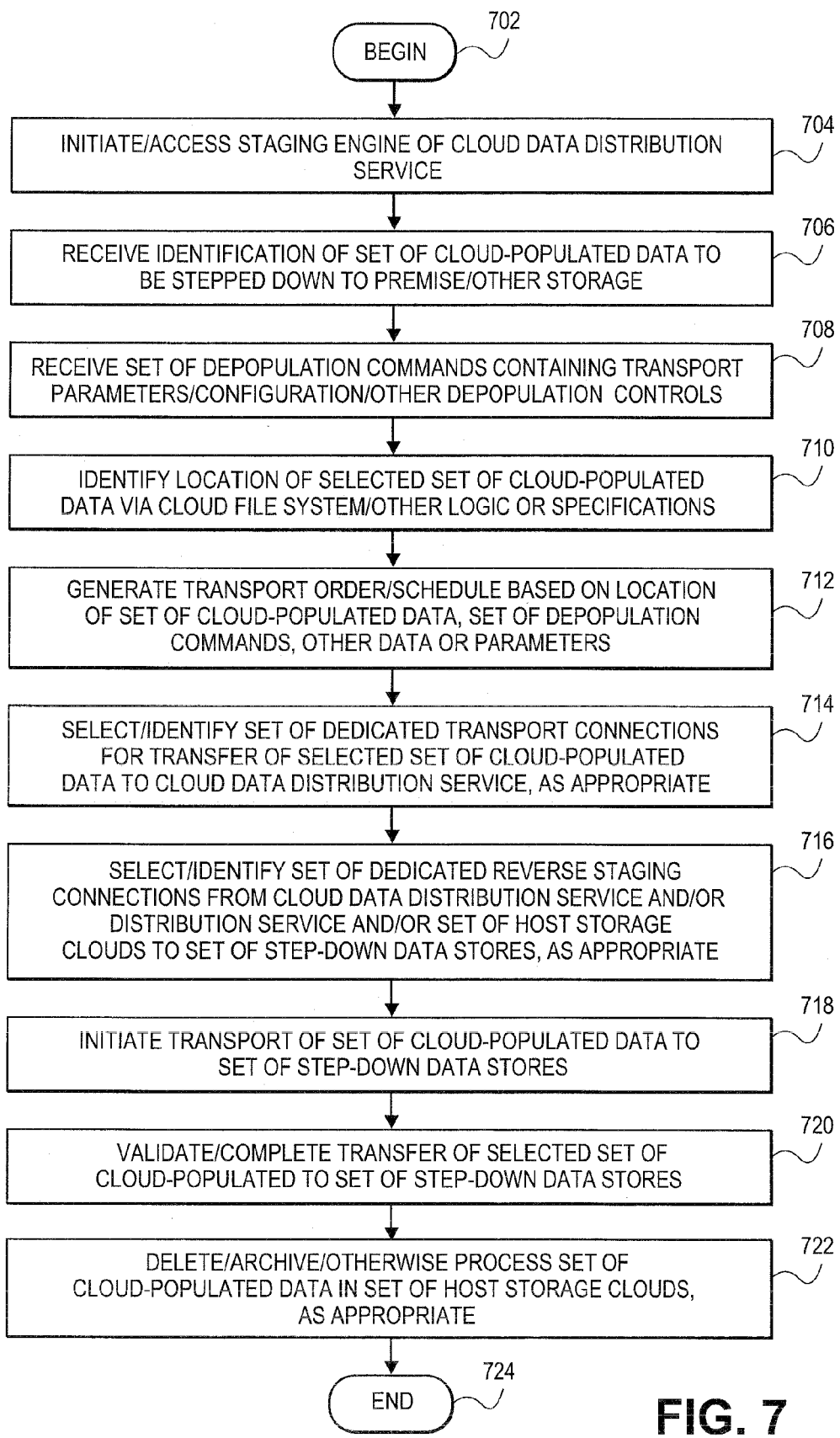
FIG. 7 illustrates a flowchart for data extraction, de-population, and delivery from a set of host storage clouds to local on-premise and/or other step-down storage sites or resources, according to various embodiments

In aspects, as noted herein, on occasions or based on circumstances or criteria that an owner, administrator, and/or other user may choose to apply, a decision may be reach to de-populate a set of cloud-populated data 190 to remove that data from a set of host storage clouds 182, and migrate, transfer, transport, and/or otherwise communicate that data out of cloud-based storage resources and store or install that data in a set of step-down data stores 194, and/or other physical or virtual storage resources. FIG. 7 illustrates various data identification, extraction, and/or other processing that can be used to perform de-population and associated data transport activities, according to aspects of the invention. In 702, processing can begin. In 704, the staging engine 174 of the data distribution service 172 can be initiated and/or accessed, for instance by an administrator, owner, operator, and/or other user of the entity owning or maintaining the set of cloud-populated data 190, and/or other users. In 706, the staging engine 174 and/or other logic or service can receive an identification of the set of cloud-populated data 190 to be de-populated, stepped down to one or more user premise in a set of user premises 198, and/or other site, destination, or storage. For instance, the administrator, owner, operator, and/or other user of the entity owning or maintaining the set of cloud-populated data 190, and/or other users can specify data or file names, locations, directories, folders, content, and/or other attributes that indicate the data to be extracted from the set of cloud-populated data 190 for transport to other on-premise, virtual, and/or other storage. In 708, the staging engine 174 and/or other logic or service can receive a set of de-population commands 192 containing transport parameters, data or transport configuration, and/or other de-population controls or settings to govern the extraction and delivery of the set of cloud-populated data 190, and/or portions thereof, to the set of user premises 198 and/or other targets, sites, locations, stores, and/or destinations.

In 710, the staging engine 174, one or more cloud management system(s) 104 of one or more of the set of host storage clouds 182 and/or other clouds, and/or other logic or service can receive, access, generate, and/or otherwise identify the location or locations of the selected set of cloud-populated data 190 via the cloud file system or systems of the set of host storage clouds 182, and/or other logic, specification, table, and/or record. For example, the staging engine 174 and/or other logic can access a directory, list, tree, and/or other record encoding the address and/or location of files and/or data contained in the selected set of cloud-populated data 190 to read or access the virtual or physical database and/or other data store in which some or all of the selected set of cloud-populated data 190 is hosted or stored. In 712, the staging engine 174 and/or other logic or service can generate a data transport order and/or schedule based on the location of the set of cloud-populated data 190, the set of de-population commands 192, and/or other data, criteria, and/or parameters. For instance, for portions of data in the set of cloud-populated data 190 which are stored in contiguous files, and/or which serialization of the data may be relatively efficient by direct reading from the one or more local cloud data stores 180, those files and/or data can be scheduled or ordered to be transmitted in serial fashion, and/or at successive times or orders. Other orderings and/or schedulings of the set of cloud-populated data 190 can be used.

In 714, the staging engine 174 and/or other logic or service can select and/or identify the set of dedicated transport connections 178 for the transfer of the selected set of cloud-populated data 190 to the data distribution service 172, as appropriate. For example, those connections or sets of connections in the set of dedicated transport connections 178 which are located within geographic proximity to the selected set of step-down data stores 194 and/or selected networks or locations in the set of user premises 198 can be identified and/or selected to transport parts or all of the set of cloud-populated data 190. Other criteria or factors can be used to identify connections in the set of dedicated transport connections 178 to be used to extract and remove data from the set of host storage clouds 182 to the data distribution service 172.

In 716, the staging engine 174 and/or other logic or service can select and/or identify the set of dedicated reverse staging connections 196 from the data distribution service 172 and/or the set of host storage clouds 182 to one or more of the step-down data stores 194, as appropriate. That is, in implementations, connections can be established from the one or more local cloud data stores 180 to the data distribution service 172 via the set of dedicated transport connections 178, and from the data distribution service 172 to one or more of the step-down data stores 194 via the set of dedication reverse staging connections 196. In implementations, in addition or instead, some or all of the necessary connections can be established from the one or more local cloud data stores 180 directly to the set of step-down data stores 194 via the set of dedicated transport connections 178, the set of dedicated reverse staging connections 196, and/or other connections, lines, and/or channels.

In 718, the staging engine 174 and/or other logic or service can initiate the transport of the set of cloud-populated data 190 and/or portions thereof to one or more of the set of step-down data stores 194. In aspects, the set of step-down data stores 194 can be co-hosted and/or located in the set of user premises 198, such as one or more local area networks (LANs) operated by corporations and/or other entities. In aspects, the set of de-population commands 192 can specify the set of step-down data stores 194 to which the selected set of cloud-populated data 190 is to be transferred and stored. In aspects, the set of de-population commands 192 can specify the connections to be used to transport the selected set of cloud-populated data 190, and/or criteria or conditions under which those connections will be selected and/or scheduled. In aspects, the set of de-population commands 192 can include a specification of the format, file type, language, encoding, security, data backup or redundancy, and/or other attributes or characteristics of the selected set of cloud-populated data 190 to be stored in the set of step-down data stores 194. In aspects, the set of cloud-populated data 190 can be transported to and stored in one data store in the set of step-down data stores 194, and/or can be transported to and stored in multiple data stores. In aspects, the set of cloud-populated data 190 can be distributed and stored to one or more original data stores in the set of user premises 198 from which that data was originally extracted and populated to the set of host storage clouds 182. In aspects, the set of cloud-populated data 190 can be distributed and stored to one or more data stores in the set of step-down data stores 194 which did not originally host or store the set of cloud-populated data 190, and/or for instance which are hosted, owned, or operated by different organizations or entities than those which originally migrated the set of cloud-populated data 190 to the set of host storage clouds 182.

In 720, the staging engine 174 and/or other logic or service can validate and/or otherwise complete the transfer of the selected set of cloud-populated data 190 to the set of step-down data stores 194 and/or other data stores, hosts, or targets. In 722, the staging engine 174 and/or other logic or service can delete, archive, and/or otherwise process the image or copy of the set of cloud-populated data 190 remaining in the set of host storage clouds 182, if that image or copy remains in the set of host storage clouds 182, as appropriate. In 724, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
receiving an identification of a set of cloud-populated data to be transported from a set of host storage clouds to at least one target data store;
identifying a data transport pathway from the set of host storage clouds to the at least one target data store; and
initiating the transport of the set of cloud-populated data to the at least one target data store via a data distribution service in view of a set of de-population commands, wherein the data transport pathway comprises a dedicated transport connection between the set of host storage clouds and the target data store.

2. The method of claim 1, wherein the at least one target data store comprises at least one data store in a premise network.

3. The method of claim 1, wherein the at least one target data store comprises at least one data store in a virtual network.

4. The method of claim 1, wherein the set of cloud-populated data comprises at least one of a set of selected databases, directories, or files stored in one or more local cloud data stores hosted in the set of host storage clouds.

5. The method of claim 1, wherein the data transport pathway comprises at least a set of dedicated reverse staging connections between the data distribution service and the at least one target data store.

6. The method of claim 5, wherein the set of dedicated reverse staging connections comprises at least one of a wide area network (WAN), a metropolitan area network (MAN), or an optical network connection.

7. The method of claim 6, wherein the data distribution service is located within at least one of geographic proximity or network proximity of the at least one target store.

8. The method of claim 1, wherein the data transport pathway comprises at least a set of dedicated transport connections between the set of host storage clouds and the data distribution service, and a set of dedicated reverse staging connections between the data distribution service and the at least one target data store.

9. The method of claim 1, wherein the set of de-population commands comprises at least one of a set of specifications for the data transport pathway, an identification of the set of cloud-populated data, an identification of a set of locations of the set of cloud-populated data, a set of security specifications for the set of cloud-populated data, or a schedule for conducting the transport of the set of cloud-populated data.

10. The method of claim 1, further comprising at least one of
deleting the set of cloud-populated data from the set of host storage clouds after transport of the set of cloud-populated data to the at least one target data store, or
archiving the set of cloud-populated data from the set of host storage clouds after transport of the set of cloud-populated data to the at least one target data store.

11. A method comprising:
receiving an identification of a set of cloud-populated data to be transported from a set of host storage clouds to at least one target data store;
identifying a data transport pathway from the set of host storage clouds to the at least one target data store; and
initiating the transport of the set of cloud-populated data to the at least one target data store via a data distribution service in view of a set of de-population commands, wherein the data transport pathway comprises at least a set of dedicated transport connections between the set of host storage clouds and the data distribution service.

12. The method of claim 11, wherein the set of dedicated transport connections comprises at least one of a wide area network (WAN), a metropolitan area network (MAN), or an optical network connection.

13. The method of claim 12, wherein the data distribution service is located within at least one of geographic proximity or network proximity of the set of host storage clouds.

14. A system comprising:
an interface to at least one target data store coupled to a data distribution service; and
a processor, communicating with the at least one target data store via the interface, the processor to—
receive an identification of the set of cloud-populated data to be transported from a set of host storage clouds to the at least one target data store,
identify a data transport pathway from the set of host storage clouds to the at least one target data store, and
initiate the transport of the set of cloud-populated data to the at least one target data store via a data distribution service in view of a set of de-population commands, wherein the data transport pathway comprises a dedicated transport connection between the set of host storage clouds and the target data store.

15. The system of claim 13, wherein the at least one target data store comprises at least one data store in a premise network.

16. The system of claim 13, wherein the at least one target data store comprises at least one data store in a virtual network.

17. The system of claim 13, wherein the set of cloud-populated data comprises at least one of a set of selected databases, directories, or files stored in one or more local cloud data stores hosted in the set of host storage clouds.

18. The system of claim 13, wherein the data transport pathway comprises at least a set of dedicated transport connections between the set of host storage clouds and the data distribution service.

19. The system of claim 18, wherein the set of dedicated transport connections comprises at least one of a wide area network (WAN), a metropolitan area network (MAN), or an optical network connection.

20. The system of claim 19, wherein the data distribution service is located within at least one of geographic proximity or network proximity of the set of host storage clouds.

21. The system of claim 13, wherein the data transport pathway comprises at least a set of dedicated reverse staging connections between the data distribution service and the at least one target data store.

22. The system of claim 21, wherein the set of dedicated reverse staging connections comprises at least one of a wide area network (WAN), a metropolitan area network (MAN), or an optical network connection.

23. The system of claim 22, wherein the data distribution service is located within at least one of geographic proximity or network proximity of the at least one target store.

24. The system of claim 13, wherein the data transport pathway comprises at least
a set of dedicated transport connections between the set of host storage clouds and the data distribution service, and
a set of dedicated reverse staging connections between the data distribution service and the at least one target data store.

* * * * *

UNITED STATES PATENT AND TRADEMARK OFFICE
CERTIFICATE OF CORRECTION

PATENT NO.       : 8,606,878 B2                                                   Page 1 of 1
APPLICATION NO.  : 13/036977
DATED            : December 10, 2013
INVENTOR(S)      : James Michael Ferris It is certified that error appears in the above-identified patent and that said Letters Patent is hereby corrected as shown below:

In the Claims

In claim 15, column 24, line 9, delete "13" and insert --14--;

In claim 16, column 24, line 11, delete "13" and insert --14--;

In claim 17, column 24, line 14, delete "13" and insert --14--;

In claim 18, column 24, line 18, delete "13" and insert --14--.

Signed and Sealed this
Twentieth Day of May, 2014

Michelle K. Lee
*Deputy Director of the United States Patent and Trademark Office*